United States Patent
Hsu

(10) Patent No.: US 11,480,438 B2
(45) Date of Patent: Oct. 25, 2022

(54) IDENTIFYING AND DISPLAYING SMOOTH AND DEMARKED PATHS

(71) Applicant: Google LLC, Mountain View, CA (US)

(72) Inventor: Stephen Charles Hsu, San Carlos, CA (US)

(73) Assignee: Google LLC, Mountain View, CA (US)

( * ) Notice: Subject to any disclaimer, the term of this patent is extended or adjusted under 35 U.S.C. 154(b) by 563 days.

(21) Appl. No.: 16/339,242

(22) PCT Filed: Oct. 7, 2016

(86) PCT No.: PCT/US2016/056008
§ 371 (c)(1),
(2) Date: Apr. 3, 2019

(87) PCT Pub. No.: WO2018/067173
PCT Pub. Date: Apr. 12, 2018

(65) Prior Publication Data
US 2019/0234749 A1 Aug. 1, 2019

(51) Int. Cl.
*G01C 21/34* (2006.01)
*G01C 21/36* (2006.01)
(Continued)

(52) U.S. Cl.
CPC ..... *G01C 21/3446* (2013.01); *G01C 21/3602* (2013.01); *G01C 21/3667* (2013.01); *G06F 16/29* (2019.01); *G06F 16/9537* (2019.01)

(58) Field of Classification Search
None
See application file for complete search history.

(56) References Cited

U.S. PATENT DOCUMENTS

| 2010/0034483 A1* | 2/2010 | Giuffrida | G06T 11/60 382/284 |
| 2010/0097457 A1* | 4/2010 | Zhang | G06K 9/00798 348/119 |

(Continued)

OTHER PUBLICATIONS

Yeran Sun et al: "Road-based travel recommendation using geo-tagged images", Computers Environment and Urban Systems, vol. 53, Sep. 1, 2015 (Sep. 1, 2015), pp. 110-122, XP055377079, US, ISSN: 0198-9715, DOI: 10.1016/j.compenvurbsys.2013.07.006. 14 pages.

(Continued)

*Primary Examiner* — Peter D Nolan
*Assistant Examiner* — Demetra R Smith-Stewart
(74) *Attorney, Agent, or Firm* — Lerner, David, Littenberg, Krumholz & Mentlik, LLP

(57) ABSTRACT

Described is a computer-implemented method which comprises receiving a plurality of images captured by at least one user device, wherein each image is associated with one of a corresponding plurality of geographic locations; determining a path between the plurality of geographic locations; determining a confidence indicator representative of whether the determined path corresponds to a demarked path, wherein determining the confidence indicator comprises determining a time of capture of each of the plurality of images; identifying the path as corresponding to a demarked route, based on the confidence indicator; and marking the plurality of images for display as a demarked route.

20 Claims, 9 Drawing Sheets

(51) Int. Cl.
*G06F 16/29* (2019.01)
*G06F 16/9537* (2019.01)

(56) References Cited

U.S. PATENT DOCUMENTS

| | | | | |
|---|---|---|---|---|
| 2010/0104137 | A1* | 4/2010 | Zhang | G06K 9/4609 |
| | | | | 382/104 |
| 2010/0104199 | A1* | 4/2010 | Zhang | G06V 20/588 |
| | | | | 382/199 |
| 2013/0190981 | A1* | 7/2013 | Dolinar | F16M 11/2014 |
| | | | | 701/41 |
| 2013/0229891 | A1* | 9/2013 | Witte | G01V 1/34 |
| | | | | 367/9 |
| 2016/0062470 | A1* | 3/2016 | Pandey | G06F 3/0354 |
| | | | | 702/150 |
| 2016/0314358 | A1* | 10/2016 | Kushida | G06V 20/588 |
| 2017/0008521 | A1* | 1/2017 | Braunstein | G08G 1/167 |
| 2017/0015317 | A1* | 1/2017 | Fasola | G01C 21/165 |
| 2018/0046867 | A1* | 2/2018 | Yang | G06K 9/6215 |

OTHER PUBLICATIONS

Junsong Yuan et al: "Mining GPS traces and visual words for event classification", Proceedings of the Workshop on Multimedia Information Retrieval (MIRO), XX, Vancouver, B.C., Canada, Oct. 30, 2008 (Oct. 30, 2008), pp. 2-9, XP058201541, DOI: 10.1145/1460096.1460099, ISBN: 978-1-60558-312-9. 8 pages.

Yan-Tao Zheng et al: "Mining Travel Patterns from GPS-Tagged Photos", Jan. 5, 2011 (Jan. 5, 2011), Advances in Multimedia Modeling, Springer Berlin Heidelberg, Berlin, Heidelberg, pp. 262-272, XP019159552, ISBN: 978-3-642-17831-3. 12 pages.

Jun Li et al: "Mining Trajectory Data and Geotagged Data in Social Media for Road Map Inference : Mining Social Media for Road Map Inference", Transactions in GIS, vol. 19, No. 1, Jan. 15, 2014 (Jan. 15, 2014), pp. 1-18, XP055377968, GB, ISSN: 1361-1682, DOI: 10.1111/tgis.12072. 18 pages.

International Search Report and Written Opinion for PCT Application No. PCT/US2016/056008, dated Jun. 13, 2017. 15 pages.

International Preliminary Report on Patentability for PCT Application No. PCT/US2016/056008, dated Aug. 31, 2018. 14 pages.

* cited by examiner

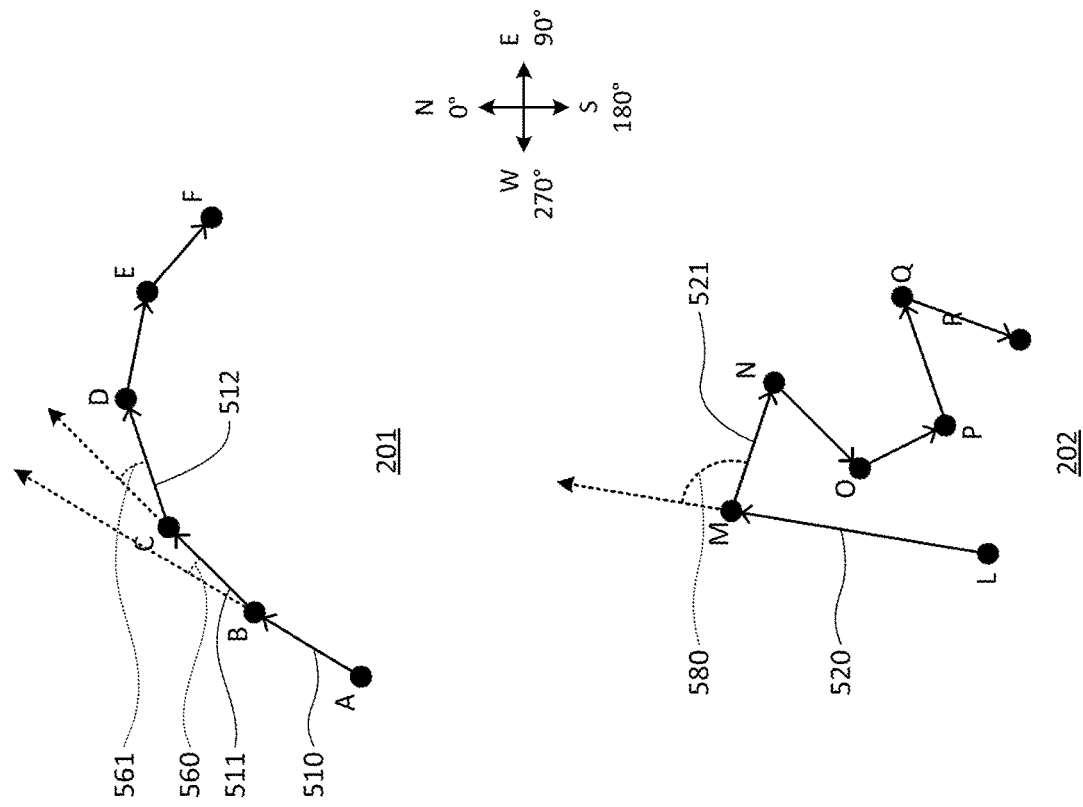
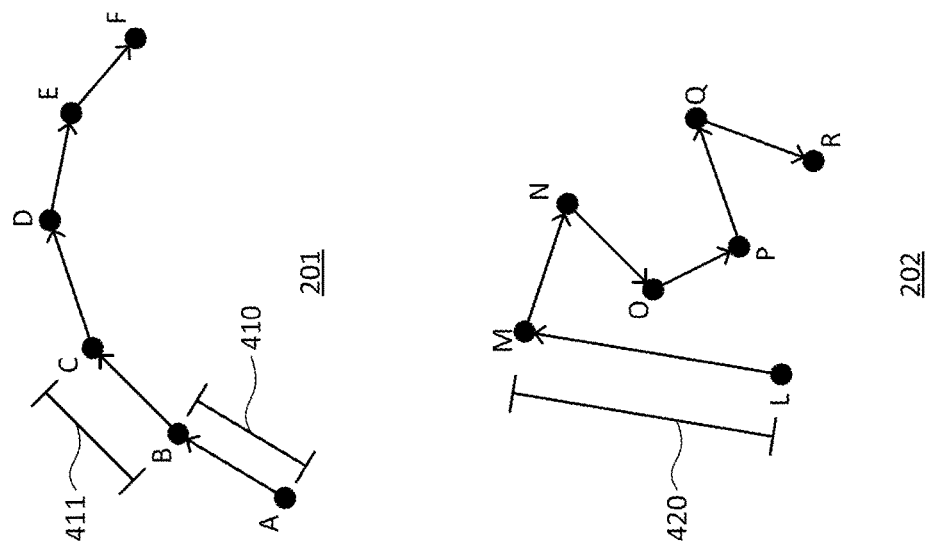
FIGURE 4
FIGURE 5

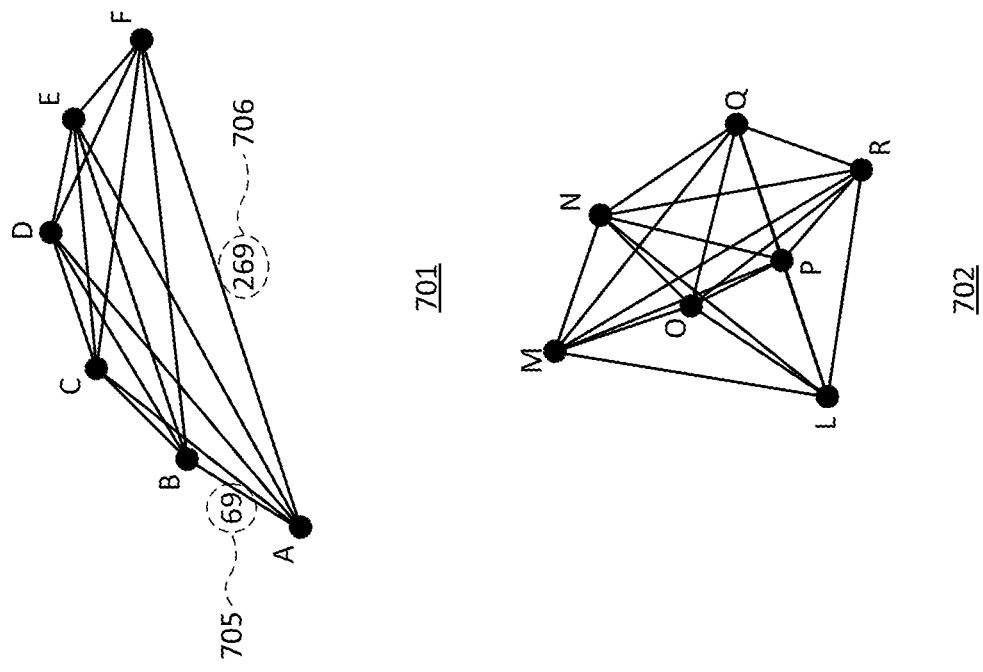
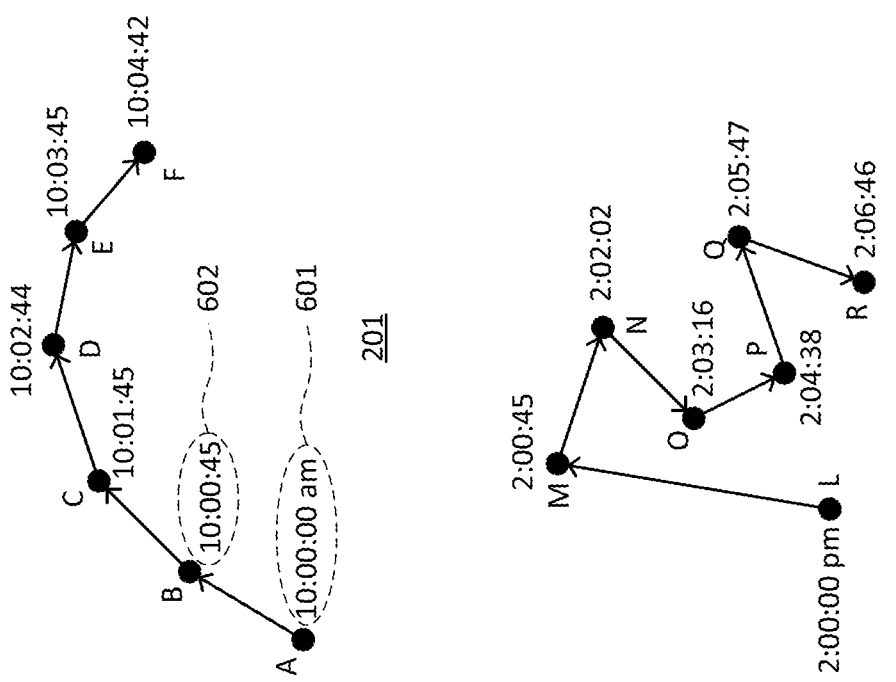
FIGURE 7
FIGURE 6

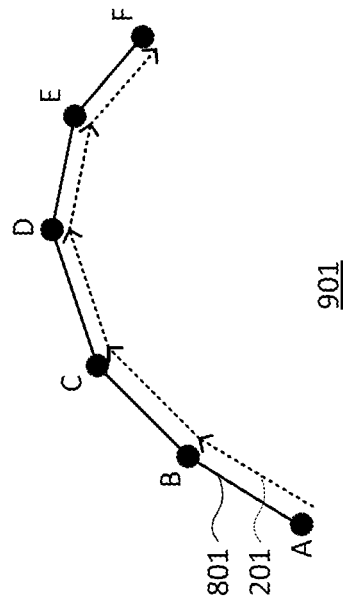
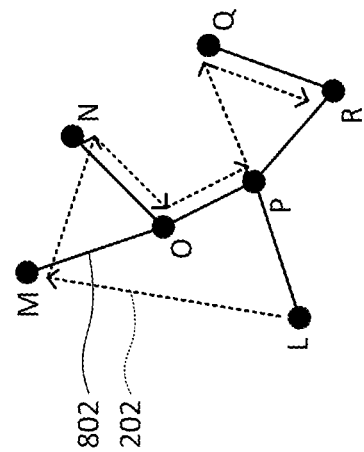
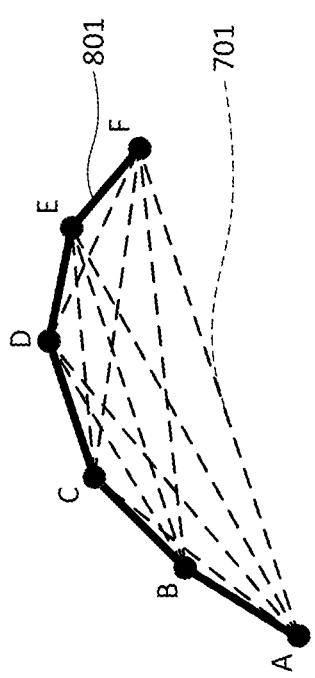
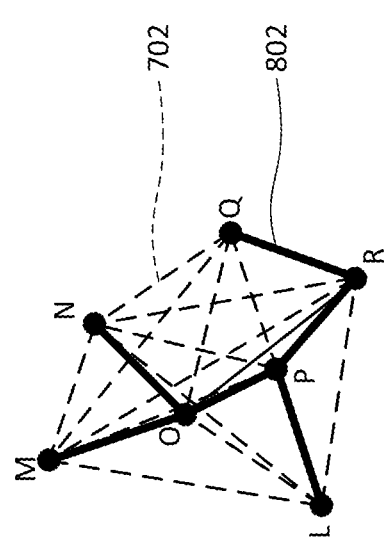
FIGURE 8
FIGURE 9

IDENTIFYING AND DISPLAYING SMOOTH AND DEMARKED PATHS

CROSS-REFERENCE TO RELATED APPLICATIONS

The present application is a national phase entry under 35 U.S.C. § 371 of International Application No. PCT/US2016/056008, filed Oct. 7, 2016, the entire disclosure of which is incorporated herein by reference.

BACKGROUND

Various systems accept sequences of images that are captured and uploaded by users. The meta-data for such images may include the date, time of day and location that the image was captured. The users may make the images available for viewing by other users. For instance, when a user views a map of geographic location, the system may place markers on the map that identify locations from which other users captured images. If the user selects the marker, the server may provide the associated image to the user's device for display.

BRIEF SUMMARY

One aspect of the technology disclosed herein relates to identifying whether a sequence of images represents a journey along a real-world, demarked path such as a road or footpath. It is often desirable to group such images together so that they are associated with the path along which they were captured. Among other advantages, this may allow the images to be processed in an efficient manner and improve the functionality of the system in which they are displayed (e.g., Google Maps with Street View).

Among other aspects, the technology involves identifying whether a sequence of images represents a route along a real-world, demarked path using a plurality of factors associated with the images. These factors may include:
(a) the number of geographic locations from which the images were captured;
(b) the average distance between successive capture locations;
(c) the average angle between successive pairs of locations;
(d) the average duration between captures; and
(e) the extent to which the capture locations were visited in an efficient order.
In order to group the images as described above, the images may be processed with a classifier that identifies the likelihood of the images corresponding with a real-world demarked path. Once grouped, a user may be presented with the option of experiencing travel along the real-world path by viewing the sequence of images in a direction of travel along the path.

Grouping a sequence of images of a particular real-world path together may also provide advantages in terms of image processing efficiency. For example, the sequence of images may be linked together in a chain. As a result and depending on the system in which the technology is implemented, chaining the images in this manner means that each image is required to be associated with only two other images— one in each direction of travel along the real-world path. Thusly-chained images are not required to be linked with other images that may have otherwise been linked, e.g., other images that are within a threshold geographic distance of a chained image but in a direction that is not on the real-world path. As a result, the amount of computer memory needed to link the images together for the purposes of viewing them in certain applications may be reduced. For example, if the application relates to displaying street level images, images captured from a road running alongside a row of buildings may be linked to each other but would not be linked to images taken inside the row of buildings (with the potential exception of where there is direct access from the road through a door of a building). Moreover, by reducing the number of image links, computing devices with low resources may increase the speed with which they display images.

Such grouping may also provide advantages associated with minimizing the number of user inputs to the computer. By automatically associating a sequence of images with a real-world, user-travelable, path, a user can be automatically directed along the path and only presented with options for deviating from the real-world path when a real-world turning exists (e.g. a road turning, or a door into a building adjacent the road). Such automatic guiding prevents the user from mistakenly moving off the real-world path by selecting an adjacent image not on the path, and thus mitigates the likelihood of the user having to provide a user input to correct unintended input.

In that regard, a computer-implemented method provides for: receiving a plurality of images captured by at least one user device, wherein each image is associated with one of a corresponding plurality of geographic locations; determining a path between the plurality of geographic locations; determining a confidence indicator representative of whether the determined path corresponds to a demarked path, wherein determining the confidence indicator comprises determining a time of capture of each of the plurality of images; and identifying the path as corresponding to a demarked route, based on the confidence indicator; and marking the plurality of images for display as a demarked route.

BRIEF DESCRIPTION OF THE DRAWINGS

FIG. 4 is an example of determining the distance between capture locations.

FIG. 5 is an example of determining the angle between steps in image sequences.

FIG. 6 is an example of determining the duration between image captures.

FIG. 7 is an example of sequences modeled as undirected graphs.

FIG. 8 is an example of minimum spanning trees of the undirected graphs.

FIG. 9 is an example of a comparison of minimum spanning trees to routes used to capture image sequences.

DETAILED DESCRIPTION

Overview

The technology relates to determining whether a sequence of images was captured by a user device as the device moved along a demarked path (e.g., a paved road, a dirt footpath through woods, or a trail marked by cairns). The determination may depend on factors such as the number of geographic locations from which the images were captured, the average distance between successive capture locations, the average angle between successive steps, the average duration between captures, and the extent to which the capture locations were visited in an efficient order. The characteristics of a given sequence may be compared with the characteristics of sequences that are already known to either follow a demarked path or not. The comparison may be used to generate a confidence value that indicates the likelihood of the sequence being associated with a demarked path. If the confidence value exceeds a threshold, the system may determine that the sequence is likely to correspond with a demarked path (such sequences are hereafter referred to as "path-based"). Among other things, path-based sequences may be used to identify previously unknown demarked paths, indicate the availability of street level images on a map and display the images to a user in sequence order.

Figure 3:
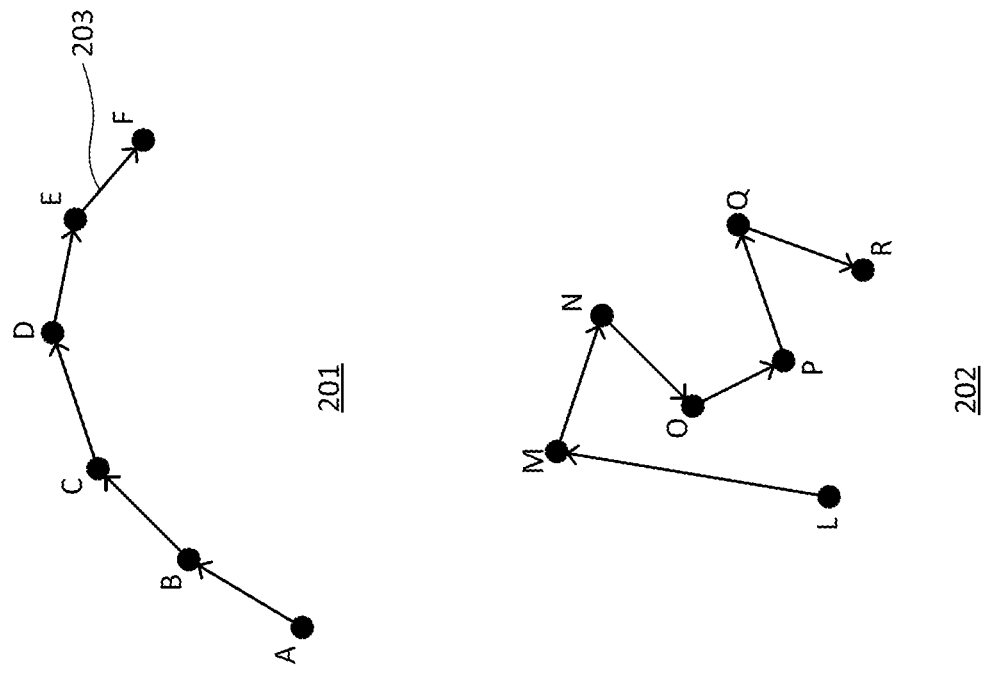
FIG. 3 is an example of two sequences of images.
Figure 2:
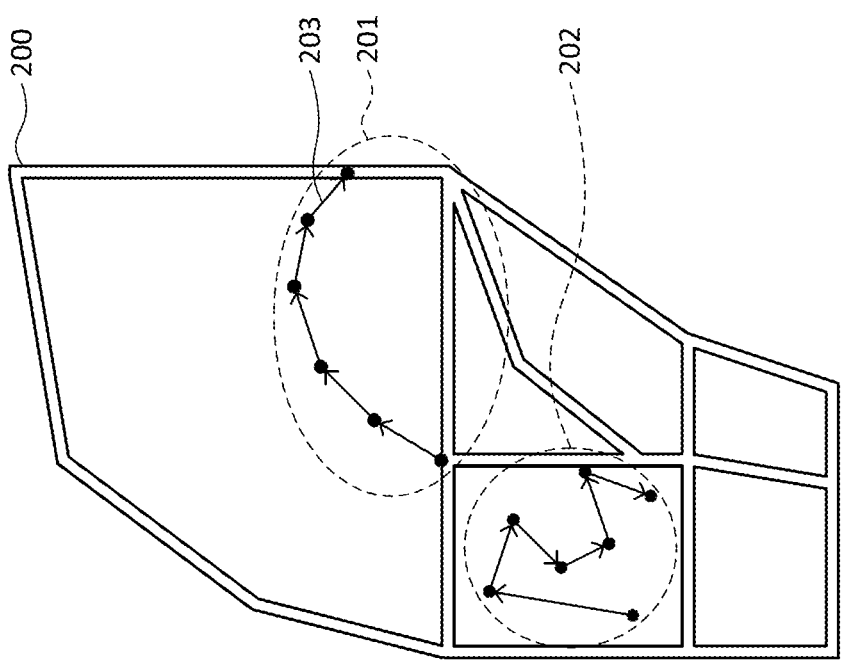
FIG. 2 is an example of a map and locations at which sequences of images were captured.

FIG. 2 provides an example of a map and two sequences of images that were captured by a pedestrian. FIG. 3 shows the relative geographic locations of each sequence's capture points and the order in which the images were captured. By way of example, after the user captured an image from location A in sequence 201, the user walked to location B and captured another image.

As noted above, the confidence value may be based on a number of factors, each one of which relates to a characteristic of an image sequence. The number of geographic locations from which a sequence of images was captured may represent one such characteristic. In that regard, the system may determine that sequence 201 was captured from 6 different locations A-F and sequence 202 was captured from 7 different locations L-R.

The average distance between successive capture locations may also factor into the calculation of the confidence value. For instance and as shown in FIG. 4, the geographic distance between capture locations A and B of sequence 201 may be 69 feet, the geographic distance between locations B and C may be 66 feet, and the average distance between a location and its successive location (AB, BC, CD, DE, EF) may be 65 feet.

Another characteristic relates to the average angle between successive stages of the sequence. In that regard and as shown in FIG. 5, the angles between the steps of sequence 201 are relatively close to straight lines. In contrast, the angles between the steps of sequence 202 are relatively sharp turns.

The average duration between successive captures may also be used as a factor when determining the likelihood of a sequence corresponding with a demarked path. For example and as shown in FIG. 6, the images are captured over a period of time, and the system may determine the average duration between captures.

The efficiency with which capture locations were visited may also be used to calculate the confidence value. In that regard and as shown in FIG. 7, the system may model all possible paths between a sequence's capture locations as an undirected graph, where each node represents a capture location and the weight of an edge between two nodes represents the geographic distance between the two corresponding capture locations. As shown in FIG. 8, the system may determine the minimum spanning tree of the graph, e.g., an efficient way of directly and indirectly connecting each node to every node. As shown in FIG. 9, an efficiency value may be generated based on how closely the user device's actual route corresponds with the minimum spanning tree. For instance, the user device's actual route 201 follows minimum spanning tree 801 exactly, thus indicating that the order in which the user traversed locations A-F was highly efficient. Route 202, on the other hand, significantly deviates from minimum spanning tree 802. This indicates that the order in which the user traversed locations L-R was relatively inefficient.

Individually and collectively, the values of the foregoing characteristics may provide helpful information when determining whether a sequence is likely to be path-based. For example, demarked paths tend to be relatively smooth, e.g., they tend to extend in straight lines and smooth curves and, as a result, the average angle between steps tends to be close to 0°. Moreover, users that visit locations in a smooth path tend to travel shorter total distances than users visiting locations in random order and, as a result, path-based sequences tend to be relatively efficient. In that regard, the smoother the route defined by a sequence, the greater the likelihood that the sequence is path-based. Yet further, if a large number of the images were captured within a few meters of each other at high speed, the images were probably captured from a vehicle travelling down a road.

Figure 10:
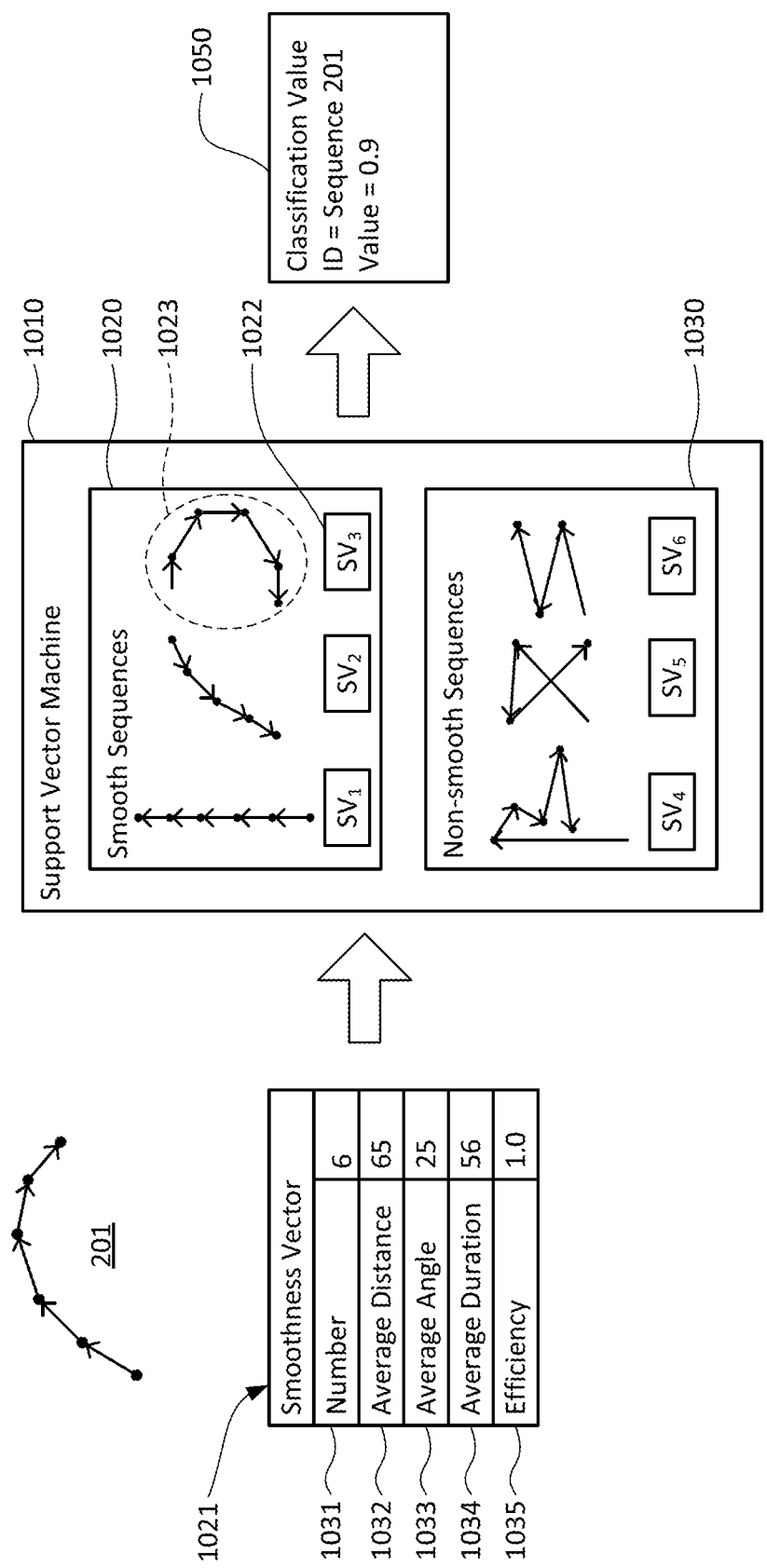
FIG. 10 is a functional diagram of the classification of a vector representing the characteristics of an image sequence.
Figure 11:
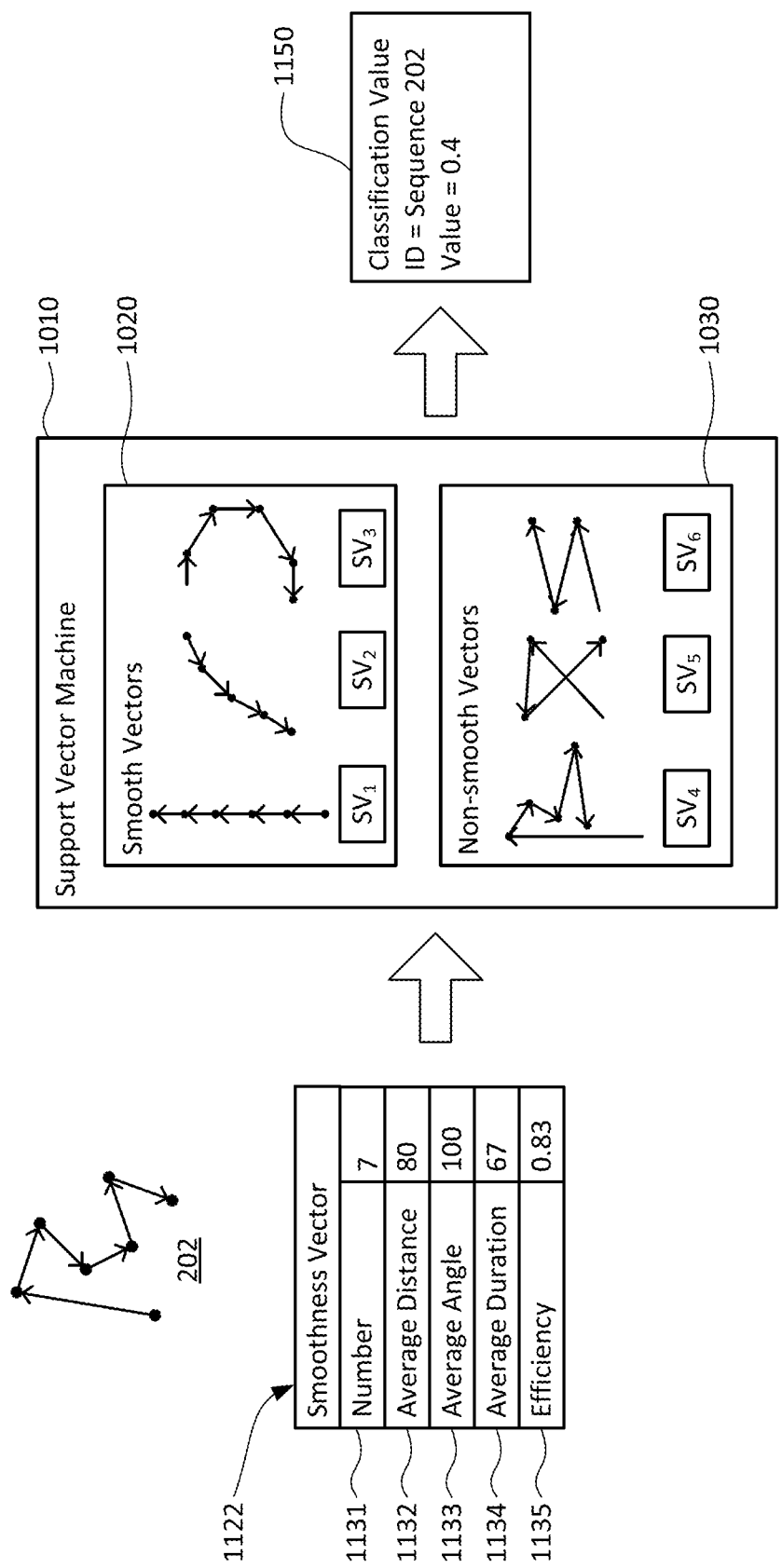
FIG. 11 is a functional diagram of the classification of a vector representing the characteristics of an image sequence.

The likelihood of a sequence being path-based may be determined by comparing the sequence's characteristics to the characteristics of sequences that are known to be path-based or not path-based. In that regard and as shown in FIGS. 10 and 11, machine learning may be used to generate a confidence value. For example, a support vector machine (SVM) may be trained with a corpus of image sequences that are manually classified as either path-based or not path-based. When the trained SVM is provided with the characteristics of a sequence to be evaluated, the SVM may generate a value that is based on the characteristics' similarity to the characteristics of the sequences that were classified as path-based and dissimilarity to the sequences that were classified as not path-based. The value may be used as the confidence value and, if the confidence value is greater than a threshold, the system may designate the sequence as path-based.

Figure 13:
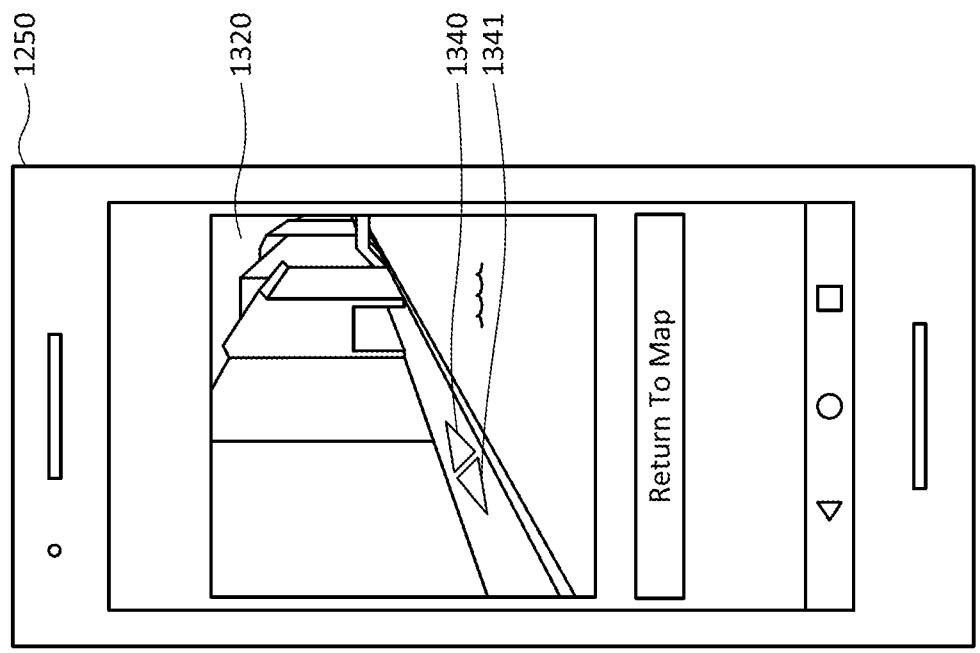
FIG. 13 is an example of displaying an image from an image sequence.
Figure 12:
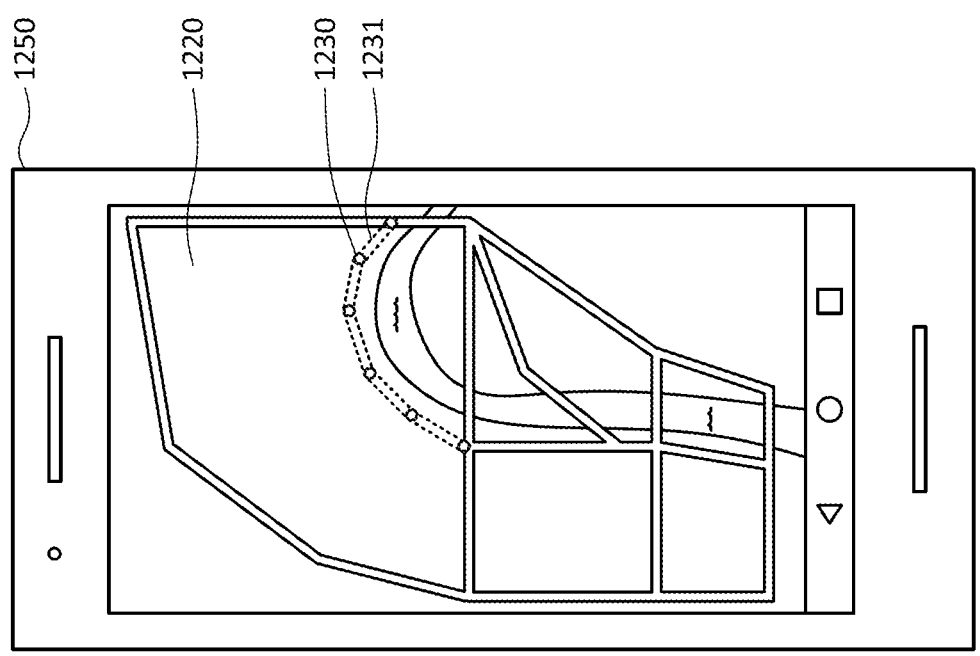
FIG. 12 is an example of displaying an image sequence on a map.

Path-based sequences may be used to identify and display previously-unknown demarked paths to users. For instance, as shown in FIG. 12, the demarked path may be shown on a map with an indication that street level images are available. As shown in FIG. 13, the user may view the images and be presented with the option of proceeding to the either the next image in the sequence or the prior image.

Example Systems

Figure 1:
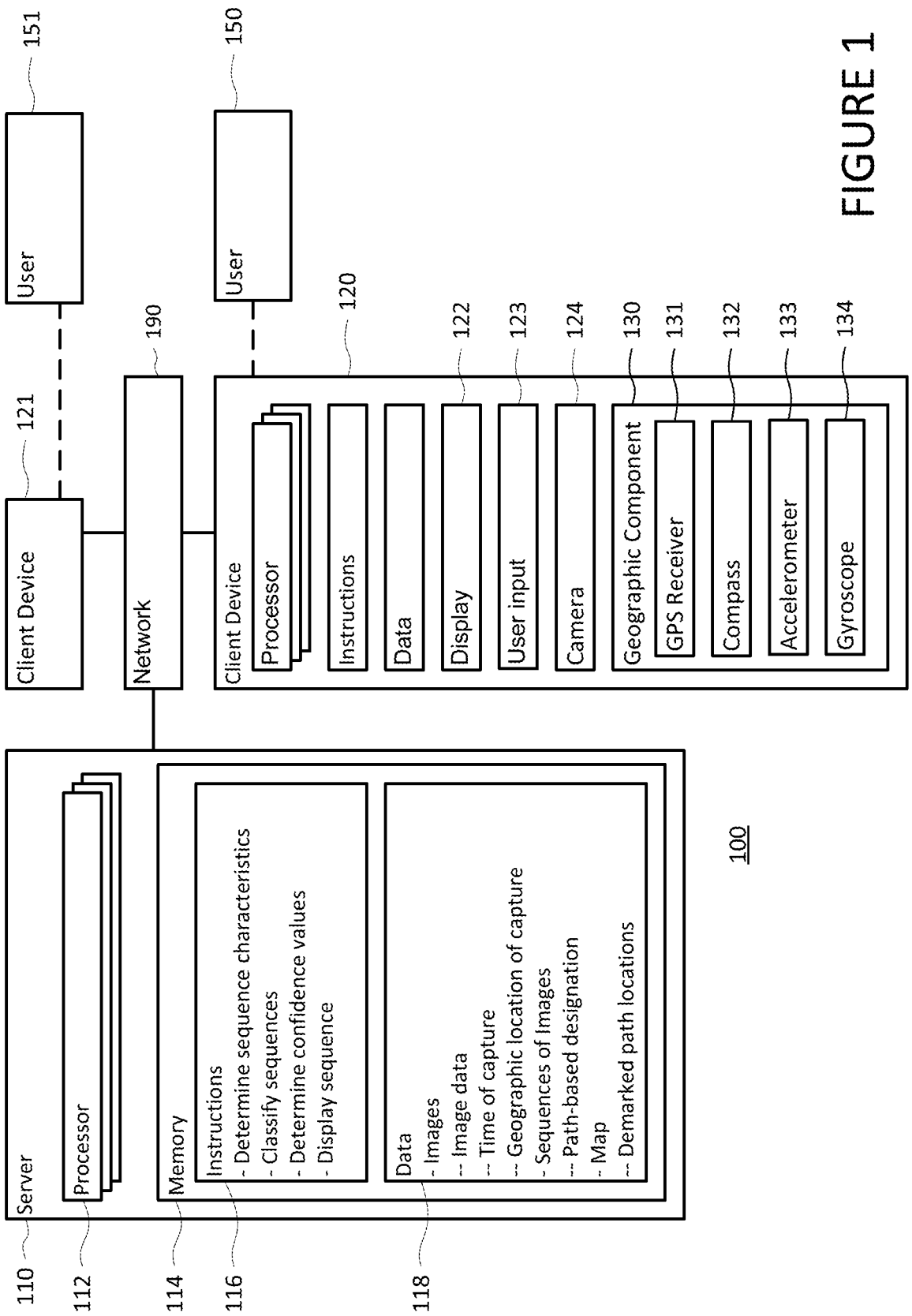
FIG. 1 is a functional diagram of a system in accordance with aspects of the disclosure.

FIG. 1 illustrates one possible system 100 in which technology disclosed herein may be implemented. In this example, system 100 may include computing devices 110, 120 and 121. Computing device 110 may contain one or more processors 112, memory 114 and other components typically present in general purpose computing devices. Although FIG. 1 functionally represents each of the processor 112 and memory 114 as a single block within device 110, which is also represented as a single block, the system may include and the methods described herein may involve multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor. Memory 114 may also include data 118 that may be retrieved, manipulated or stored by processor 112. Memory 114 may be any type of storage capable of storing information accessible by the relevant processor, such as media capable of storing non-transitory data. By way of example, memory 114 may be a hard-disk drive, a solid state drive, a memory card, RAM, DVD, write-capable memory or read-only memory. In addition, the memory may include a distributed storage system where data, such as data 118, is stored on a plurality of different storage devices which may be physically located at the same or different geographic locations.

The instructions 116 may be any set of instructions that are capable of being accessed and executed by processor 112 or other computing device. For example, the instructions may include computer programs that executable by a personal computer or server. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data 118 may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 190 and capable of directly and indirectly communicating with other nodes of network 190. Although only a few computing devices are depicted in FIG. 1, a typical system may include a large number of connected computing devices, with each different computing device being at a different node of the network 190. The network 190 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 190. Computing devices 120 and 121 may be a client computing devices. Server 110 may display information by using network 190 to transmit information to device 120 for display to user 150 on display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computer intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), user input device 123 (e.g., a mouse, keyboard, touchscreen, microphone, etc.), and camera 124.

Computing device 120 may also be a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. In that regard, some of the instructions executed during the operations described herein may be provided by the operating system whereas other instructions may be provided by an application installed on the device. Computing devices in accordance with the systems and methods described herein may include other devices capable of processing instructions and transmitting data to and from humans and/or other computers including network computers lacking local storage capability and set top boxes for televisions.

Computing device 120 may include a component 130 to determine the geographic location and orientation of the device. For example, the component may contain circuits such as a GPS receiver 131 to determine the device's latitude, longitude and altitude position. The component may include software for determining the position of the device based on other signals received at the client device 120, such as signals received at a cell phone's antenna from one or more cell phone towers. It may also include a magnetic compass 132, accelerometer 133 and gyroscope 134 to determine the direction in which the device is oriented. By way of example only, the device may determine its pitch, yaw or roll (or changes thereto) relative to the direction of gravity or a plane perpendicular thereto.

Server 110 may store map-related data, at least a portion of which may be transmitted to devices 120-21. Map data may store road names and locations, geographic boundaries (e.g., city names and borders), and other information associated with geographic locations. The map data is not limited to any particular format. For instance, the map data may include bitmap images of geographic locations such as photographs captured by satellite or aerial vehicles. The map data may also include information that may be rendered as images on demand, such as storing street locations and pedestrian trails as vectors and street and trail names as strings of text characters.

The map-related information may include points of interest (POI), such as a restaurant, business, building, park, lake or any other item that is associated with a geographical location of potential interest to users. In addition to the POI's name and location, the system may associate a POI with other information as well. For example, depending on the nature of the POI, the system may store a POI's category type (e.g., "restaurant" or "park"), hours of operation, the name and contact information of the POI's owner, and references to other POI (e.g., a list of names and locations of stores within a mall).

Locations may be stored in memory using one or more reference systems, e.g., latitude/longitude positions, street addresses, street intersections, an x-y coordinate with respect to the edges of a map (such as a pixel position when a user clicks on a map), building names, and other information in other reference systems that is capable of identifying a geographic location (e.g., lot and block numbers on survey maps). A geographic location may also be stored as a range of the foregoing (e.g., the location of a city may be defined by the geographic position of its borders) and the system may translate locations from one reference system to another. For example, server 110 may access a geocoder to convert a location stored as a street address into a latitude/longitude coordinate (e.g., from "1500 Amphitheatre Parkway, Mountain View, Calif." to "37.423021°, −122.083939°").

Data 118 may also store images captured at surface level. By way of example, client device 120 may be a mobile phone and the surface-level images may be still photographs captured by a person 150 standing on a trail or sidewalk. The surface-level images may also include frames of videos captured by multiple cameras mounted on a car as the car travels down a road, in which case the cameras may be positioned at or below the legal limit for typical vehicle height limits (e.g., 7 to 14 feet above street level). Images may be uploaded to server 110 by users 150-51 via network 190, and may be accompanied by data identifying the time (e.g., date and time of day) of capture and the geographic location of camera 124 at the time of capture. The location of capture may be determined based on output from geographic component 130. References herein to one image being before or after another image refers to the images' capture times. Similarly, references to a first capture location being before or after a second capture location refers to the times at which an image was captured at the first location relative to the second location.

The images may also include panoramic images such as an image stitched together from a series of images captured by the same camera rotating through different camera angles or from images captured at substantially the same time by multiple cameras at different camera angles. The panoramic images may capture a scene 360° in both the horizontal and vertical directions, or may capture a scene less than 360° in one or both of the horizontal and vertical directions.

Example Methods

Operations in accordance with a variety of aspects of the method will now be described. It should be understood that the following operations do not have to be performed in the precise order described below. Rather, various steps can be handled in different order or simultaneously.

The system may identify a sequence of images that are arranged in the order in which the images were captured. For instance, processor 112 may search for and select a set of images wherein each image was captured by the same client device, was captured within a threshold amount of time after the immediately prior image (if any), was captured at a location within a threshold distance from the location of the immediately prior image (if any), or any combination of the foregoing. Processor 112 may determine a sequence of images by determining the temporal order of the images in the set, where the start of the sequence is the earliest image and the end of the sequence is the latest image. To the extent each image is associated with a location, the sequence of images may also be considered a sequence of locations.

FIGS. 2 and 3 provide an example of two different image sequences stored in system data 118. In this example: sequences 201 and 202 were taken by users 150 and 151 on the same day using client devices 120 and 121, respectively, as the users walked around the area defined by map 200; users 150 and 151 uploaded the images to server 110 as files containing pixelated image data; the meta-data of the uploaded files includes the date and time of day of capture, as well as the latitude-longitude coordinate provided by a GPS component at the time of capture and; before the image files were uploaded, the system data representing map 200 did not identify any demarked paths corresponding with the capture locations. Each black dot (labeled A-F and L-R in FIGS. 3-9) represents the location from which one image of the sequence was captured. The arrows represent the order of the sequence, e.g., arrow 203 indicates that the image captured at location F was captured after image captured at location E.

In order to determine whether a sequence corresponds with a demarked path, the system may consider a variety of factors that are based on different characteristics of the sequence.

One such characteristic may relate to the number of geographic locations in the sequence. In that regard, processor 112 may determine that sequence 201 was captured from a total of 6 different locations A-F and sequence 202 was captured from a total of 7 different locations L-R.

Another characteristic relates to the distances between successive capture locations. As shown in FIG. 4, the system may determine that the geographic distance 410 between capture locations A and B is 69 feet, the geographic distance 411 between locations B and C is 66 feet and the geographic distance 420 between locations L and M is 65 feet. The system may calculate a single number based on all of the geographic distances between successive locations in a sequence. In that regard, processor 112 may determine that the average distance between each location and the next location in sequence 201 (e.g., the average distance between pairs AB, BC, CD, DE, EF) is 65 feet. Processor 112 may also determine that the average distance between each location and the next location in sequence 202 (e.g., LM, MN, NO, OP, PQ, QR) is 80 feet. Although the example average values described above (e.g., 65 and 80 feet) and below are based on the arithmetic mean value, the average values may also be alternatively based on the arithmetic median value. For example, the median value may be more robust than the mean value at handling errors in uploaded user data, such as the errors in the time or location of capture.

Still another characteristic relates to the change in angle from one stage of the sequence to the next. For instance, the system may determine the angle between steps in the sequence, where the term "step" refers to the movement from one capture location to the next capture location. In that regard and as shown in FIG. 5, a step may be represented as a vector extending from one capture location to the next and the angle of the vector may be expressed as a compass direction (e.g., where due North is 0° and due South is 180°). Based on the latitude and longitude of locations A-C, processor 112 may determine that the compass direction of steps 510 and 511 are 31° and 45°, respectively. Processor 112 may thus determine that the change in angle from step 510 to step 511 is 14° (|31°−45°|), which is relatively close to straight line. There is thus a relatively small change in direction from step 510 to 511. The angular change 561 from step 511 to 512 is somewhat greater, e.g., 27° (|45°−72°|). The system may calculate a single number based on all of the angle changes between successive steps of a sequence. By way of example, processor 112 may calculate that the average angular change of all successive steps of sequence 201 is 25°.

In comparison, the system may determine that the changes in direction in sequence 202 are much more significant than sequence 201. For instance, processor 112 may determine that the angular change 570 between steps 520 and 521 is 100°. In that regard, whereas the angular change between the first two steps of sequence 201 was relatively small, the angular change between the first two steps of sequence 202 is relatively close to a sharp right turn. The system may calculate that the average angular change of all successive steps of sequence 202 is 100°.

The average duration between successive image captures may also be used as a factor when determining the likelihood of a sequence corresponding with a demarked path. FIG. 6 shows the temporal order and time of day the images of sequences 201 and 202 were captured, e.g., the time of day 601 that image A was captured (10:00:00 a.m.) and the time of day 602 that image B was captured (10:00:45 a.m.). Server 110 may thus determine that the duration between the times that images A and B were captured is 45 seconds. The system may calculate a single number for the entire sequence based on the durations between successive images, e.g., the system may calculate the average duration between each image and the next image in the sequence. Based on the example times shown in FIG. 6, the average duration between successive capture locations of sequences 201 and 202 is 56 and 67 seconds, respectively.

Yet another characteristic relates to the efficiency with which capture locations were visited by the user. For example, server 110 may determine the extent to which total distance traveled by the user was close to the minimal distance necessary to capture all of the images. In that regard and as shown in FIG. 7, the system may model sequences 201 and 202 as undirected graphs 701 and 702, where each node represents a capture location and is connected to every other node via a weighed edge. The weight may be based on the geographic distance between the capture locations corresponding with the nodes connected to the edge. In that regard, weight 705 of edge AB may be set to 69 and weight 706 of edge AF may be set to 269.

The system may use the graph to compare the path travelled by the device with a highly efficient order for visiting all of the locations of the sequence. For instance, the system may determine the minimum spanning tree of the undirected graph. In that regard and as shown in FIG. 8, processor 112 may determine the minimum spanning tree 801 and 802 (shown as thick solid lines) of graphs 701 and 702 (which include the dashed lines), respectively.

An indicator of the efficiency of a sequence may be generated based on how closely the user device's actual route corresponds with an efficient route. As shown in comparison 901 of FIG. 9, the user device's actual route 201 follows minimum spanning tree 801 exactly. This indicates that the order in which the user traversed locations A-F was highly efficient. Route 202, on the other hand, significantly deviates from minimum spanning tree 802. This indicates that the order in which the user traversed locations L-R was relatively inefficient. The efficiency of a sequence may thus be inversely proportional to the difference between length of the route taken by the user and possible routes that are shorter (if any). The efficiency value may be calculated for each sequence based on the relationship of the total distance travelled relative to the total distance of the minimum spanning tree, e.g.:

$$E_s = d_{min}/d_s, \text{ where}$$

$E_s$=efficiency value of the image sequence "s",
$d_{min}$=sum of all geographic distances between capture location pairs defined by the minimum spanning tree, and
$d_s$=sum of the lengths of all steps in sequence s.

In that regard, the efficiency value of sequence 201 may be 1.00 (323 feet/323 feet) and the efficiency value of sequence 202 may be 0.83 (399 feet/480 feet).

The likelihood of a sequence being path-based may be determined by comparing the sequence's characteristics to the characteristics of sequences that are known to be path-based or not path-based. By way of example and as shown in FIG. 10, image sequences may be represented as multi-dimensional vectors, where each dimension corresponds with a characteristic of the sequence. For instance, the system may generate a 5-dimensional vector 1021 for sequence 201, wherein the vector relates to a set of values 1031-35 that correspond with the number of images, average distance, average angle, average duration and efficiency characteristics of the sequence. This disclosure occasionally describes the vector as a smoothness vector because, as noted above, at least some of its values individually or collectively relate to the smoothness of the sequence. The vector may be provided as input to support vector machine (SVM) 1010.

SVM 1010 may be trained with sequences that are known to be path-based or not path-based. For instance, a user may be presented with a number of different sequences and may use a client device to classify sequences 1020 as smooth and sequences 1030 as non-smooth. By way of example, the system may display sequences on a map, and the user may use the client device to identify sequences that correspond with roads, sidewalks or footpaths that are shown on the map and those that do not. The system may determine the characteristic values and generate vectors for the classified vectors, such as vector 1022 for sequence 1023, and associate the classified vectors with desired output values, e.g., 1.0 for smooth vectors 1020 and 0.0 for non-smooth vectors 1030.

When the sequences-to-be-evaluated are input to the machine-learning component, the component may output a value based on how similar the sequence is to sequences that have been already classified as path-based or not path-based. For instance, if a perfectly-smooth sequence corresponds with a first value and an extremely-jagged sequence corresponds with a second value, the outputted value may be closer to the first value (relative to the second value) when the path is relatively smooth and closer to the second value (relative to the first value) when the path is relatively jagged. By way of example, the classification value 1050 of sequence 201 may be 0.9, which indicates that sequence 201 is much closer to the class of smooth sequences 1020 than the class of non-smooth sequences 1030. As shown in FIG. 11, the results may be very different for sequence 202. When the system generates a smoothness vector 1122 based on the characteristic values 1131-35 of sequence 202, and provides the vector to SVM 1010 for evaluation, the system may determine that the classification value 1150 of the sequence is 0.4, which is closer to the class of jagged sequences 1030 than the class of smooth sequences 1020.

The system may designate a sequence as path-based based on the classification value. For instance, the system may determine a confidence value that is equal to or based on the classification value. If the classification value exceeds a threshold value, then the system may determine that the likelihood of the sequence corresponding with a demarked path is sufficiently high to designate the sequence as path-based. By way of example, if the threshold value is 0.8, the system may designate sequence 201 as path-based because its classification values of 0.9 exceeds the threshold. The system may similarly designate sequence 202 as not path-based because its classification values of 0.4 is lower than the threshold.

The path-based sequences may be displayed to users. For example and as shown in FIG. 12, one of the client devices may be a mobile phone 1250 displaying a portion 1220 of the map shown in FIG. 2. The map may be annotated to indicate the probable location of a path, e.g., the map may include visual indicia 1230 identifying each capture location of sequence 201. The map may also include visual indicia 1231, such as line segments, that connect each capture location in the sequence to the next capture location (if any). The visual features of the displayed path-based sequence may correspond with the visual characteristics of other paths. For instance, if the system indicates the availability of street level images that were captured by a vehicle equipped by highlighting street segments, the visual indicia 1230-31 may match such highlighting.

The path-based sequences may also be used to automatically direct users along the path. For instance, a user may select one of the capture points 1230 along path 1231 and, in response as shown in FIG. 13, client device 1250 may display the image 1320 captured at that location. The system may also display indicia, such as arrows 1340 and 1341, that show the direction of the next and prior capture locations, respectively. In that regard, the user may be automatically guided along the real-world, user-travelable, path, thus mitigating the likelihood of the user having to provide a user input to correct unintended input. If the user selects one of the arrows 1340 and 1341, the system may display the corresponding image. The path 1231 may also be used by the system when determining and displaying a suggested route from the user's current location to a user-selected destination. Aspects of the system may provide other technical benefits as described in the Summary section of this disclosure.

Other aspects of the system may classify sequences based on different characteristics than those described above. For example, the vectors may include an additional dimension based on the number of images captured in the sequence, since two or more images in a given sequence may have been captured from the same location. The average duration characteristic may be excluded from the factors used to classify a sequence if the order of the sequence of images is known (e.g., the file name of a photo may include a number that increases by one each time a new picture is taken) but the precise time of capture is not. The efficiency value described above may be replaced with a value that is based on how closely the user's actual route corresponds with the shortest possible route between the capture locations. The average angle value between successive stages described above was based on the assumption that there was one step in each stage; however, the average angle value between stages may also be determined based on each stage including at least two steps.

Yet further, rather than basing the confidence value solely on the classification value, the confidence value may be based on other factors as well. For example, the confidence value may be based on the function $w_{class}v_{class}+w_{imagery}v_{imagery}$, where $w_{class}$ and $w_{imagery}$ are weights, $v_{class}$ is the classification value, and $v_{imagery}$ is a value based on how similar satellite images of the capture locations are to visual characteristics of a sidewalk.

The system may also be used for purposes other than identifying previously-unknown demarked paths. For instance, a sequence may have been captured by a user when travelling along a real-world user-travelable path such as when in a boat as the boat traversed a lake or by a user walking through a large field. When another user views a map of the lake or field, the system may display the sequence and its images as described above in connection with FIGS. 12 and 13, provided the sequence is determined to be sufficiently smooth. If the sequence is too jagged, it may be difficult for a user to maintain a sense of the direction when they view the images in order. The determination of smoothness may be carried out in any of the ways described above.

Figure 14:
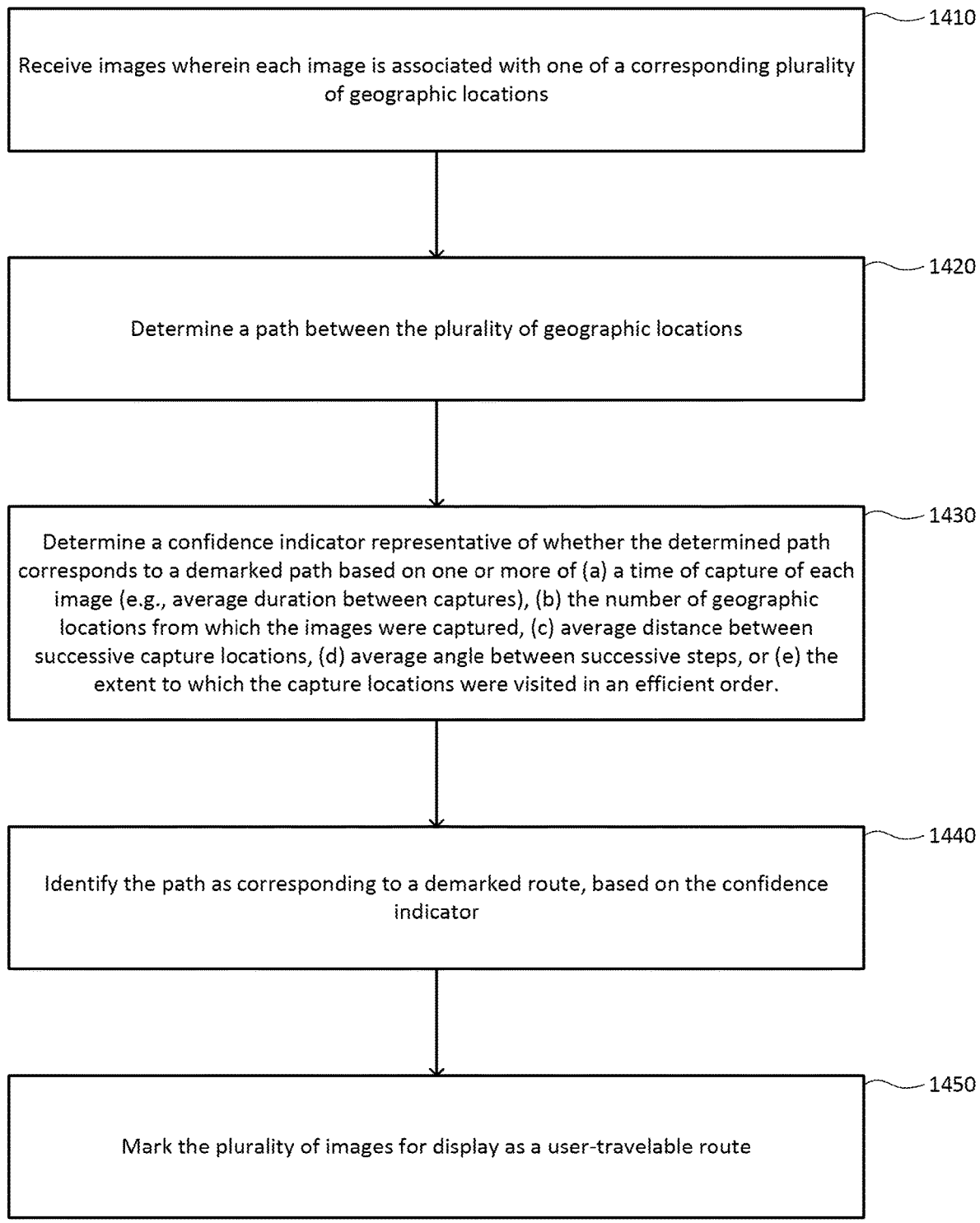
FIG. 14 is a flow diagram in accordance with aspects of the disclosure.

The flowchart of FIG. 14 illustrates some of the features of the methods described above. Block 1410 shows the feature of receiving a plurality of images captured by at least one user device, wherein each image is associated with one of a corresponding plurality of geographic locations. Block 1420 shows the feature of determining a path between the plurality of geographic locations. Block 1430 shows the feature of determining a confidence indicator representative of whether the determined path corresponds to a demarked path, wherein determining the confidence indicator includes determining one or more of (a) a time of capture of each image (e.g., average duration between captures), (b) the number of geographic locations from which the images were captured, (c) average distance between successive capture locations, (d) average angle between successive steps, or (e) the extent to which the capture locations were visited in an efficient order. Block 1440 shows the feature of identifying the path as corresponding to a demarked route, based on the confidence indicator. Block 1450 shows the feature of marking the plurality of images for display as a demarked route.

As these and other variations and combinations of the features discussed above can be utilized without departing from the invention as defined by the claims, the foregoing description of the embodiments should be taken by way of illustration rather than by way of limitation of the invention as defined by the claims. The provision of examples of the invention (as well as clauses phrased as "such as," "e.g.", "including" and the like) should not be interpreted as limiting the invention to the specific examples; rather, the examples are intended to illustrate only some of many possible aspects. Similarly, references to "based on" and the like means "based at least in part on".

The invention claimed is:

1. A computer-implemented method comprising:
   receiving a plurality of images captured by at least one user device, wherein each image is associated with one of a corresponding plurality of geographic locations and a time of capture;
   determining a path between the plurality of geographic locations;
   determining a confidence indicator representative of whether the determined path corresponds to a demarked path, wherein determining the confidence indicator comprises determining an average duration between the times of capture of the plurality of images;

identifying the path as corresponding to a demarked route, based on the confidence indicator; and marking the plurality of images for display as a demarked route.

2. The computer implemented method of claim 1, wherein the plurality of images is a sequence of images captured over a period of time at the plurality of geographic locations.

3. The computer implemented method of claim 1, wherein determining the path between the plurality of geographic locations comprises determining a temporal order in which the plurality of images were captured at the geographic locations.

4. The computer implemented method of claim 3, wherein the determined path connects the plurality of geographic locations in the determined temporal order.

5. The computer implemented method of claim 1, wherein the demarked path is a real-world route between a start location and an end location.

6. The computer-implemented method of claim 1, comprising identifying the path as corresponding to a demarked path in response to determining that the confidence indicator exceeds a threshold.

7. The computer implemented method of claim 1, comprising identifying the path as corresponding to a demarked path in response to determining that the determined path corresponds to a route that has been travelled by a user of the at least one user device.

8. The computer-implemented method of claim 1, wherein determining the confidence indicator further comprises determining a total number of the plurality of images.

9. The computer implemented method of claim 1, wherein the determined path comprises a plurality of stages separated by the plurality of geographic locations and determining the confidence indicator further comprises determining an angle change between successive stages of the determined path.

10. The computer-implemented method of claim 1, wherein determining the confidence indicator further comprises determining an average distance between successive geographic locations in the determined path.

11. The computer-implemented method of claim 1, wherein determining the confidence indicator further comprises determining an efficiency indicator for the determined path.

12. The computer-implemented method of claim 11, wherein determining the efficiency indicator comprises comparing a length of a minimum spanning tree or shortest path between the plurality of geographic locations with a length of the determined path.

13. The computer implemented method of claim 12, comprising determining the efficiency indicator as maximum when the length of the minimum spanning tree or shortest path is determined to correspond to the length of the determined path.

14. The computer-implemented method of claim 11, wherein the efficiency indicator is determined as inversely proportional to a difference between the length of the minimum spanning tree or shortest path and the length of the determined path.

15. The computer-implemented method of claim 1, comprising providing, for display, at least one indicia indicating the determined path between the plurality of images as a demarked route.

16. The computer-implemented method of claim 1, comprising providing, for display, a plurality of indicia representing the geographic locations associated with each of the plurality of images.

17. The computer-implemented method of claim 15, comprising providing the indicia for display on a geographic map.

18. A computer program comprising computer-executable instructions which, when executed by at least one computing device, cause the computing device to perform the method of:

receiving a plurality of images captured by at least one user device, wherein each image is associated with one of a corresponding plurality of geographic locations and a time of capture;

determining a path between the plurality of geographic locations;

determining a confidence indicator representative of whether the determined path corresponds to a demarked path, wherein determining the confidence indicator comprises determining an average duration between the times of capture of the plurality of images;

identifying the path as corresponding to a demarked route, based on the confidence indicator; and marking the plurality of images for display as a demarked route.

19. An apparatus comprising at least one processor and at least one memory containing computer-executable instructions which, when executed by the at least one processor, cause the apparatus to perform the method of:

receiving a plurality of images captured by at least one user device, wherein each image is associated with one of a corresponding plurality of geographic locations and a time of capture;

determining a path between the plurality of geographic locations;

determining a confidence indicator representative of whether the determined path corresponds to a demarked path, wherein determining the confidence indicator comprises determining an average duration between the times of capture of the plurality of images;

identifying the path as corresponding to a demarked route, based on the confidence indicator; and marking the plurality of images for display as a demarked route.

20. The apparatus of claim 19, wherein the plurality of images is a sequence of images captured over a period of time at the plurality of geographic locations.

* * * * *